Patented Apr. 18, 1944

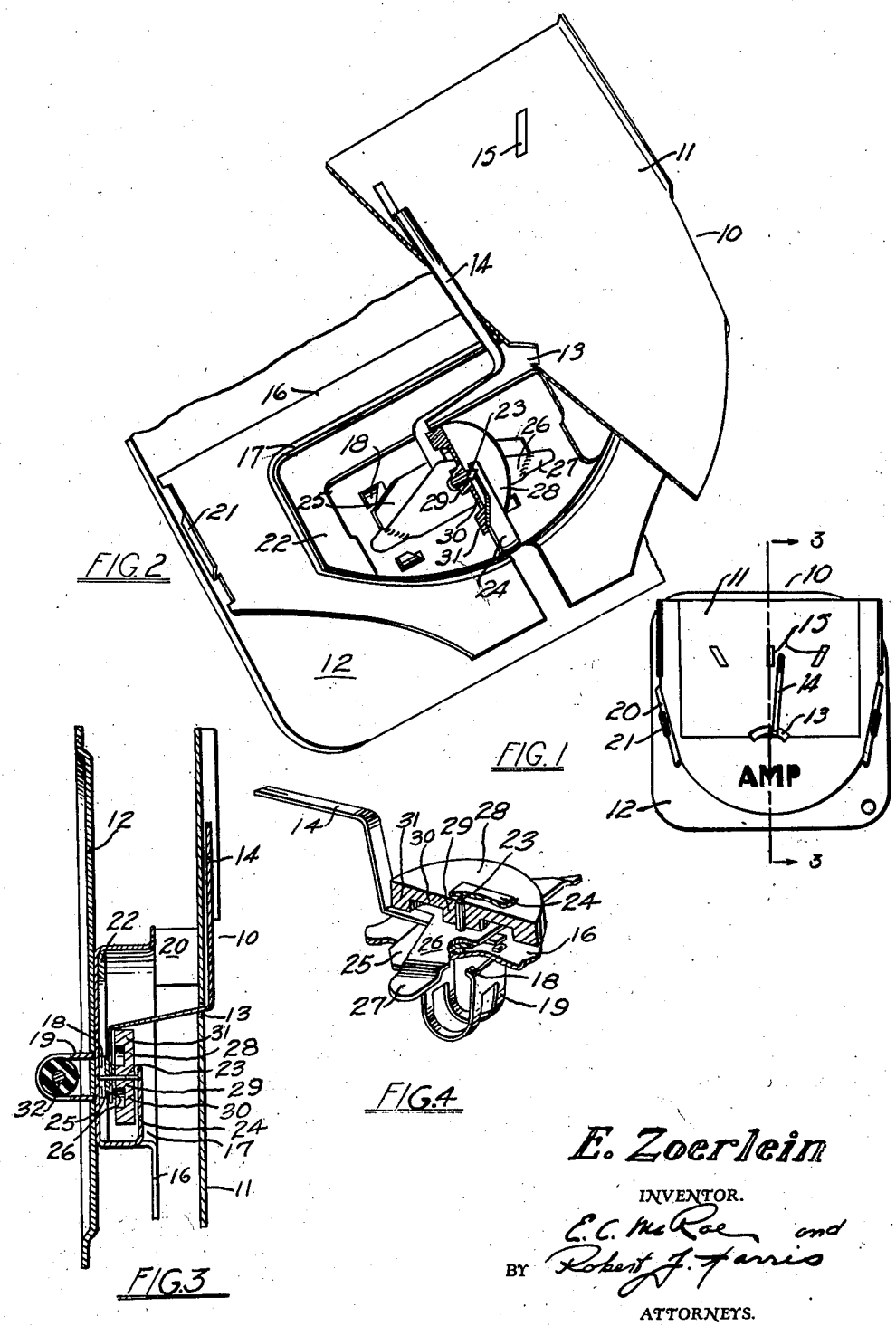

2,346,811

UNITED STATES PATENT OFFICE 2,346,811

AMMETER

Emil Zoerlein, Dearborn, Mich., assignor to Ford Motor Company, Dearborn, Mich., a corporation of Delaware Application December 17, 1941, Serial No. 423,277

2 Claims. (Cl. 171—95)

This invention concerns electrical-indicating instruments; and, more particularly, that class of instruments used in automobiles, airplanes, boats and the like.

As a specific example of this invention, an ammeter designed to be used in an automobile is shown and described, but the invention may be utilized as well in other instruments of a similar nature.

It will be understood that the ammeter, as used on the automobile, is not intended to give exact electrical measurements, but rather is relied upon as an indication of whether or not the battery is being charged or discharged during the operation of the vehicle. Consequently, the dial of such an instrument is rarely calibrated with particularity because the information required is merely whether the reading is "charge" or "discharge."

The example shown is an ammeter of the stationary coil type, which will be described in detail below, and which is representative of the instrument used on many motorcars. For the purpose for which it is intended, its accuracy is within necessary limits and is extremely economical to make. The disadvantage of the ammeter lies in the fact that the pivoted moving parts, which include the armature, the pivot pin and the pointer, are made extremely light for extreme sensitivity and, when they are moved under the influence of electric current or even some action of the vehicle, do not readily come to rest but instead will hunt or vibrate over a large portion of the dial for a considerable period. Even in normal operation, this hunting tendency is undesirable as tending to distract the driver's attention, but particularly with some types of voltage and charge control, the intermittent action of the current is such that the needle will vibrate erratically and continuously over the whole dial. In either case, the value of the ammeter as an indicating instrument is lessened, since it cannot be relied upon at all times to give even an approximate instantaneous reading; and, at the same time, it is dangerously distracting.

An object of this invention is to provide a construction for such an instrument that will stabilize the action of the pointer. A further object is to obtain an ammeter in which the needle does not hunt or fluctuate unduly, either because of the circuit characteristics or in response to the operation of switches or the motion of the vehicle.

With these and other objects in view, this invention consists in the arrangement, construction and combination of the various parts of the improved device, as described in the specification, claimed in the claims, and illustrated in the accompanying drawing, in which:

Figure 1 is an elevation, substantially full sized, of an ammeter embodying this invention.

Figure 2 is a cut-away perspective view of a part of the ammeter mechanism on a larger scale.

Figure 3 is a sectional view, on an enlarged scale, taken on the line 3—3 of Figure 1.

Figure 4 is a perspective view on an enlarged scale showing the rotating mechanism.

Referring now to Figure 1, the ammeter 10 is shown, which comprises the dial plate 11 and the mounting plate 12. The dial plate 11 is slotted at 13 and the pointer 14 extends therethrough and is mounted to move between the calibrations 15.

As best seen in Figure 2, the ammeter mechanism is supported on an intermediate plate 16 formed with a roughly rectangular depression 17, which rests on the mounting plate 12. These two plates are maintained in engagement by the lugs 18 on the cable stirrup 19, which extend through them, and are bent over. The dial plate 11 also has downwardly extending ears 20 on each side which engage the intermediate plate 16, these two elements being held together by co-operating lugs 21.

Disposed in the depression 17 is the permanent magnet 22, while the pivot pin 23 is rotatably supported between the floor of the depression 17 and the arm 24 which is formed from the metal of the intermediate plate 16 and is bent inwardly. Fixedly attached to the pivot pin 23 is the soft iron armature 25 which is generally rectangular in shape. Associated therewith is a spacing means 26, which has two extending points 27, limiting the armature and hence the pointer movement in either direction. Fixedly secured to the armature and rotating with it is the pointer 14. The cable 32, which extends through the cable stirrup 19, serves as the stationary coil completing the electrical circuit of the device.

So far, the construction described embodies elements which in general are to be found in a stationary coil ammeter. One of the distinctive elements characterized by this invention is the damping wheel 28 which is mounted on the pivot pin 23 and rotates with the armature and pointer. As shown in Figure 2, this is substantially a small flywheel, including a hub 29, web 30 and a circumferential flange 31. The weight of the damping wheel is substantial as compared with that of the other moving parts—the pointer, the armature, the spacer and the pivot pin. In fact, the weight of the damping wheel exceeds that of the other movable components. It will, however, be understood that the weight alone is not of paramount importance; but that the inertia effect of the wheel is. This, of course, may be varied to suit any particular form of construction, the principal consideration being that the inertia effect of the damping wheel be sufficient. Obviously, this is not a quantity dependent upon the damping wheel alone but the mass and disposition of all moving parts of the ammeter must be taken into consideration. Inasmuch as each construction presents a different problem, no fixed rule may be given therefor but simple experimentation in matching different damping wheels to the specific ammeter is resorted to and this, of course, presents no difficulties since inspection of the result obtained with each readily determines the most suitable combination.

Satisfactory damping for automotive purposes is obtained when, after the needle has been actuated, it advances past the point of actual indication, returns to that point, and thereafter remains at it. This is about the minimum movement that may be obtained and may be contrasted with an undamped ammeter in which the pointer will vibrate over a wide range of the dial and continue these vibrations almost continuously. With the damping wheel, on the other hand, the pointer comes to rest and does not change its position substantially until the indication changes basically.

Considering the use to which the instrument is put, this stability is obtained without any significant loss in sensitivity since the damping weight is in exact balance about the pivot point and adds to the inertia without creating an unbalance. That is to say, the weight of the unbalanced portions—the pointer, armature, and spacer—is kept as small as practicable, while the major mass is concentrated on the balanced portions—the pivot pin and the damping wheel.

Attention is further directed to the specific construction of the ammeter body in which the movable parts are fully protected in the depression in the intermediate plate which at the same time increases the rigidity of this plate in the area of its attachment to the mounting plate. Other advantages and economies of this construction are readily apparent on examination.

Some changes may be made in the arrangement, construction and combination of the various parts of the improved device without departing from the spirit of the invention and it is the intention to cover by the claims such changes as may reasonably be included within the scope thereof.

I claim as my invention:

1. In an ammeter of the class described, a dial plate, an intermediate plate having a central depression, extensions from said dial plate engaging said intermediate plate to maintain said plate in spaced relationship, a permanent magnet in said depression, an armature pivotally mounted in said depression adjacent to said permanent magnet, magnetizable means arranged to impress a torque on said armature in response to a current to be measured, a pointer secured to said armature extending to and through said dial, and an inertia mass within said depression and secured to and adapted to move with said armature and pointer, said inertia mass being uniformly distributed about the pivot point of said armature, and effective to limit the response of said armature to intermittent impressed torques.

2. The structure of claim 1, which is further characterized in that the weight of the pointer and armature is kept at a practicable minimum and the major portion of the movable mass of said ammeter is concentrated in said inertia mass.

EMIL ZOERLEIN.